United States Patent
Kautz et al.

(10) Patent No.: US 10,649,133 B2
(45) Date of Patent: May 12, 2020

(54) LIGHTING SYSTEM FOR AN INTERIOR MODULE

(71) Applicant: AUDI AG, Ingolstadt (DE)

(72) Inventors: Oliver Kautz, Bad Friedrichshall (DE); Daniel Schlüter, Heilbronn (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/335,585

(22) PCT Filed: Jul. 17, 2017

(86) PCT No.: PCT/EP2017/000856
§ 371 (c)(1),
(2) Date: Mar. 21, 2019

(87) PCT Pub. No.: WO2018/054511
PCT Pub. Date: Mar. 29, 2018

(65) Prior Publication Data
US 2020/0025996 A1    Jan. 23, 2020

(30) Foreign Application Priority Data
Sep. 23, 2016  (DE) .................. 10 2016 011 542

(51) Int. Cl.
*G02B 6/00* (2006.01)
*F21V 8/00* (2006.01)

(52) U.S. Cl.
CPC ......... *G02B 6/0065* (2013.01); *G02B 6/0051* (2013.01); *G02B 6/0055* (2013.01)

(58) Field of Classification Search
CPC ... G02B 6/0065; G02B 6/0051; G02B 6/0055
See application file for complete search history.

(56) References Cited

U.S. PATENT DOCUMENTS

| | | |
|---|---|---|
| 2008/0019115 A1 | 1/2008 | Park et al. |
| 2009/0141476 A1 | 6/2009 | Meir et al. |
| 2013/0250607 A1 | 9/2013 | Schmuck et al. |
| 2015/0192728 A1 | 7/2015 | Thompson et al. |

FOREIGN PATENT DOCUMENTS

| | | |
|---|---|---|
| DE | 3602819 A1 | 7/1986 |
| DE | 10240270 A1 | 3/2004 |
| DE | 102006023593 | 11/2007 |
| DE | 102010023247 A1 | 12/2011 |
| DE | 102013100941 A1 | 7/2014 |
| DE | 102013007938 | 11/2014 |

(Continued)

*Primary Examiner* — Anne M Hines
(74) *Attorney, Agent, or Firm* — Henry M. Feiereisen LLC

(57) ABSTRACT

The invention relates to a lighting system for an interior module of a vehicle, comprising at least one light source (17), at least one light guide (3), and at least one emission element (5). The at least one light guide (3) consists at least partly of silicone, and the at least one emission element (5) is optically connected to the at least one light guide (3) on at least one side. During the operation of the lighting system, the at least one emission element (5) is provided with light generated by the at least one light source (17) by means of the at least one light guide (3). The lighting system (1) is flexibly designed such that upon being connected to a support layer (25), the lighting system (1) adapts to the shape of the support layer (25).

15 Claims, 3 Drawing Sheets

(56) References Cited

FOREIGN PATENT DOCUMENTS

| | | |
|---|---|---|
| DE | 102015216142 A1 | 3/2016 |
| DE | 102014116758 A1 | 5/2016 |
| DE | 102015004411 A1 | 10/2016 |
| FR | 2991936 | 12/2013 |
| WO | WO 2012/127389 A1 | 9/2012 |

LIGHTING SYSTEM FOR AN INTERIOR MODULE

CROSS-REFERENCES TO RELATED APPLICATIONS

This application is the U.S. National Stage of International Application No. PCT/EP2017/000856, filed Jul. 17, 2017, which designated the United States and has been published as International Publication No. WO 2018/0541 and which claims the priority of German Patent Application, Serial No. 10 2016 011 542.4, filed Sep. 23, 2026, pursuant to 35 U.S.C. 119(a)-(d).

BACKGROUND OF THE INVENTION

The present invention relates to a lighting system for an interior module of a vehicle and to a production method for a lighting system.

An interior of a vehicle is very difficult to illuminate during operation of the vehicle, i.e. during travel, since light sources that are visible through windows of the vehicle, could blind and/or irritate other road users and light sources arranged in a footwell of the vehicle only insufficiently radiate upwards to allow, for example, a passenger to read a map.

Devices for dispersing light from a light source are described in the prior art.

German document DE 10 2006 023 593 A1 discloses a light guide element for use in motor vehicle components. The light guide element includes a light-coupling surface and a light-decoupling surface and is at least proportionately formed of an elastic material.

German patent application DE 10 2013 007 938 A1 discloses a light guide of a light-conducting material with decoupling structures located on a surface, with the decoupling structures decoupling light coupled in in longitudinal direction of the light guide at an angle to the decoupling structures into the environment of the light guide.

A lining element for an interior of a vehicle with a translucent covering layer arranged on a base part of the lining element is disclosed in German document DE 102 40 270 A1.

German publication DE 10 2010 023 247 A1 introduces a fitting part for an interior of a vehicle with a shaped body on which is disposed a planar flexible light guide.

German document DE 10 2013 100 941 A1 discloses an interior lining part, which has a light-emitting layer on an inner side of a carrier component.

French document FR 2 991 936 A1 introduces a lining part with a lighting element arranged underneath a decorative layer.

Against this background, it is an object of the present invention to provide a way for the roadworthy illumination of a vehicle interior.

SUMMARY OF THE INVENTION

To achieve the afore-mentioned object, a lighting system for an interior module of a vehicle is introduced having at least one light source, at least one light guide, and at least one radiating element, with the at least one light guide being made, at least in part, of silicone, and with the at least one radiating element being optically connected on at least one side with the at least one light guide, and with the at least one radiating element being supplied, during operation of the lighting system, via the at least one light guide with light generated by the at least one light source, wherein the lighting system is designed flexible enough to enable the lighting system to conform, when connected to a carrier layer, to a shape the carrier layer.

Configurations of the present invention will become apparent from the description and the dependent claims.

The introduced lighting system is provided in particular for illuminating a vehicle interior by using a radiating element which is supplied with light from a light source via a light guide. The introduced lighting system may, for example, be arranged on a vehicle door, a seat or a roof lining, i.e. integrated in particular in the vehicle door, the seat or the roof lining. According to the invention, provision is made for a flexible configuration of the introduced lighting system and attachment as part of a surface refinement to a carrier, such as, e.g., an interior structure of a vehicle door, to thereby assume a respective shape of the carrier.

In order to enable flexible, i.e. deformable, configuration of the introduced lighting system, provision is made for the light guide provided in accordance with the invention to at least in part be made of silicone, in particular of transparent silicone.

In the context of the present invention, a radiating element is to be understood as a material suitable for emitting light. In particular, the radiating element provided according to the invention is configured to be flat to thereby enable an advantageously wide illumination of a vehicle interior. The radiating element provided according to the invention, which is made, e.g., of a nonwoven, may hereby act as a diffuser for dispersing light.

In the context of the introduced invention, an interior module is to be understood as a component of a vehicle selected from the following list of components: vehicle door, vehicle seat, trim, and roof lining.

The term "optically connected" is to be understood in the context of the present invention as a state in which there is a connection between two components, such as, e.g., a light guide and a radiating element, for transmission of the light from one component to the other component. In order to realize such an optically connected state, an optical connection between, for example, a light guide and a radiating element, can be constructed from a connecting layer, which is made, for example, of an adhesive layer of transparent material.

The term "connecting with a carrier layer" is to be understood in the context of the introduced invention as a process in which an object, such as, e.g., the lighting system according to the invention, is connected with a carrier or a surface layer of a carrier by a laminating process for example. The lighting system is hereby pressed against the carrier so as to change its spatial configuration according to a spatial configuration of the carrier to thereby attach thereon, in particular formfittingly.

It is conceivable that the radiating element provided according to the invention is connected in part or across the entire surface with the light guide provided in accordance with the invention. The radiating element may be designed, for example, as a nonwoven with a density of, in particular, 50 g/m$^2$ and able to diffusely disperse light beams emitted by the light guide. This means that the radiating element can act as a diffuser. The radiating element is connected to the light guide via an adhesive film, such as, e.g., a dispersion film. By means of the radiating element, the interior module according to the invention can be connected to a decorative product, such as, for example, a surface layer of a textile or leather.

In order to enable a radiating of light beams generated by the light source provided in accordance with the invention, it is provided that a surface layer applied to the radiating element provided according to the invention has at least one perforation opening through which light beams can escape into the surroundings of a corresponding lighting element.

The afore-described structure of a light guide layer, a layer having a radiating element and a decorative layer can be provided quickly and efficiently for a variety of interior modules by an industrial production process. In this case, the decorative layer can be configured, for example, translucent or transparent.

Since the radiating element influences to a considerable extent properties of light emitted by the introduced lighting system, different shapes or material structures of the radiating element are conceivable. For example, to generate diffuse light, a respective radiating element can be designed as a diffuser, which, for example, is colored. The radiating element may be made, at least in part, of polyurethane, in particular of polyurethane foam, or of a nonwoven, such as, e.g., a spun-bonded fabric. When applying diffusor material to the backside, i.e. facing a surroundings, on a radiating element, the diffuser material is able to penetrate, e.g., perforations of the radiating element and accordingly to determine a lighting characteristics of the radiating element. Furthermore, the diffuser material prevents, for example, through formation of a closed surface on the radiating element, contamination of the radiating dement, in particular of perforations of the radiating element. According to a possible configuration of the introduced interior module, provision is made for the at least one light source to be embedded as integrative component in the at least one light guide.

In order to provide a lighting system which can be integrated as a complete module ready for installation in a production process, provision is made in particular for the at least one light source provided according to the invention to be embedded in a respective light guide. The at least one light source may hereby be embedded in the light guide via electric connections which are longer with respect to a length of the light guide, so that the electrical connections do not break or tear in the presence of potential deformations of the lighting system and the flexibility of the lighting system is not adversely affected by the at least one light source. Advantageously, the at least one light source is flat and flexible, for example configured in the form of a light strip.

According to a further possible configuration of the introduced interior module, provision is made for the transparent adhesive layer to be made of a reactive film system or a thermoplastic adhesive film.

To connect the radiating element provided according to the invention and the light guide provided according to the invention a transparent or translucent film, which itself is flexible, is particularly suitable. An adhesive film, i.e. a film which itself has adhesive properties or is coated with adhesive material, can be used quickly and without complex movement patterns in a mass production process for connecting radiating element and light guide. Of course, several films or a film system of several reactive and/or non-reactive adhesive films may be used.

According to a further possible configuration of the introduced lighting system, it is provided that the at least one light guide is arranged outside the at least one light guide and supplies the light guide with light beams, e.g. via at least one further light guide.

According to a further possible configuration of the introduced lighting system, provision is made for the at least one light guide to be connected with at least one reflector at least on a side opposite to the at least one radiating element, with the at least one reflector being configured for reflecting light beams, generated by the at least one light source, in the direction of the at least one radiating element.

Using a reflector, such as, for example, a metal foil, which is embedded in particular in colored silicone, light beams emitted by the light guide provided in accordance with the invention in opposition to the radiating element can be reflected back into the light guide and ultimately into the environment of the lighting system. This means that a light output of a respective light source of the lighting system according to the invention is increased by a reflector, so that, for example, compared to an embodiment without reflector, fewer light sources or light sources with lower energy consumption can be used. It is conceivable that the reflector is configured as part of the lighting system or integrated into the lighting system.

The use of colored silicone, i.e. for example silicone that has been colored black in a screen printing process, disparities in radiation behavior of a respective reflector can be avoided or at least reduced.

In order to connect a reflector, embedded, for example, in silicone, with the light guide according to the invention, which is made, at least in part, of silicon, the use of, e.g., a silicone adhesive becomes possible, which is applied upon the reflector and/or the light guide in a printing process, such as, e.g., a screen printing process. Provision may hereby be made for the silicone adhesive to be incorporated as a translational element in a light beam path, so that the silicone adhesive acts in a predefined manner on a beam path of respective light beams generated by a light source and deflects the light beams, for example, to a predefined position within the light guide or in an environment of the lighting system. For this purpose, the silicone adhesive can be applied by the printing process to precisely predefined locations on the light guide and/or the reflector.

According to a further possible configuration of the introduced lighting system, provision is made for the at least one reflector to be connected on a side opposite to the at least one radiating element with an intermediate layer which enables a robust adhesive connection of the lighting system with a carrier material.

In order to connect a light guide or a reflector, in particular a reflector, which is embedded in a silicone, with a carrier material, the use of in particular an intermediate layer, such as, e.g., a nonwoven which is to be connected with both a silicone and a carrier of, e.g., plastic, is suitable.

According to a further possible configuration of the introduced lighting system, it is provided that the decorative layer is connected on a side of a layer having at least one perforation opening, which side faces the at least one radiating element, with a protective layer such that the protective layer prevents ingress of dirt particles into the radiating element and/or the light guide.

To prevent ingress of particles, such as dirt for example, into the lighting system according to the invention and in particular the light guide, provision may be made for a protective layer which shields the light guide against the surroundings and which in particular is firmly connected to a respective decorative layer. For this purpose, the protective layer can be bonded or sewn for example with the decorative layer.

According to a further possible configuration of the introduced lighting system, provision is made for the at least one radiating element to formfittingly engage the at least one perforation opening of the decorative layer and to form with the decorative layer a smooth surface, which is substantially impermeable to contamination.

Due to a formfitting engagement of the radiating element provided according to the invention in respective perforation openings of a decorative layer, a smooth surface can be created, which can be illuminated or is illuminated by the lighting system according to the invention, i.e. in particular is to be backlighted. Such a smooth surface is substantially impermeable to contamination.

According to a further possible configuration of the introduced lighting system, provision is made for the protective layer to formfittingly engage a perforation opening of the decorative layer and to form with the decorative layer a smooth surface, which is substantially impermeable to contamination.

Due to a formfitting engagement of a protective layer, arranged on the radiating element provided according to the invention, in respective perforation openings of a decorative layer, a smooth surface can be created, which can be illuminated or is illuminated by the lighting system according to the invention, i.e. in particular is to be backlighted. Such a smooth surface is substantially impermeable to contamination. Provision is hereby made in particular to configure the protective layer transparent or translucent so that radiation of light by the lighting system is not prevented. It is conceivable that the decorative layer is designed as part of the lighting system or integrated into the lighting system.

According to a further possible configuration of the introduced lighting system, provision is made for the at least one light guide to include light-conducting fibers.

In order to achieve a dispersion of light within the light guide, the light guide can include light-conducting fibers, such as, e.g., glass fibers, which are incorporated in a filling material of the light guide, such as, e.g., a plastic or a silicone. The light-conducting fibers receive light, which is provided by a light source, and conduct the light through the light guide into the radiating element provided according to the invention.

Light-conducting fibers are particularly advantageous for dispersing light, since they can be used both for guidance through narrow locations, such as, e.g., a seam, and for illumination of a large surface. In particular, it is provided that a light source or light-conducting fibers is/are embedded in a weatherstrip or a tuck of a decorative element, which, for example, delimits a vehicle door from an interior.

According to a further possible configuration of the introduced lighting system, provision is made for the at least one light source to be incorporated, at least in part, in a seam of a fabric delimiting the vehicle door towards the outside.

To arrange a light source in a space-saving and aesthetically pleasing manner on a vehicle door, a seam trench of, for example, a double lapped felled seam can be used, in which, e.g., a holder for receiving the light source is sewn. This means that a holder, which, for example, is provided by a base frame of a vehicle door, engages the seam trench of the seam in order to secure or receive the light source there. Furthermore, a configuration provides that the radiating element provided according to the invention is arranged flatly on a base frame of a vehicle door and extends in its dimensions along an area about a control island of the vehicle door.

In the context of the introduced invention, the term "bonding" is to be understood as a connection of two fabrics using a bonding material, wherein the bonding material can be configured, for example, as dispersion adhesive, 2-component adhesive, hot melt, solvent-containing adhesive or any other technically suitable material for joining two fabrics.

It is conceivable that the light guide according to the invention includes UV or temperature-curing silicone and that a production process involves first application of the radiating element and/or the reflector to the light guide in a state in which the light guide is liquid or pasty, and the light guide is cured later.

Furthermore, the present invention relates to a production method for a lighting system for an interior module of a vehicle, wherein at least one light guide made, at least in part, of silicone is optically connected to at least one radiating element, and the at least one radiating element is supplied via the at least one light guide with light generated by at least one light source, and wherein a silicone portion of the at least one light guide is selected such that the lighting system is flexible and conforms to a shape of a carrier layer when connected to the carrier layer.

The introduced production method is used in particular for the production of the introduced lighting system.

The introduced production method provides in particular that a light guide, which is made, at least in part, of silicone, is optically connected with a radiating element in order to deflect light beams, generated by a light source, via the radiating element. It is hereby provided that the light guide and the radiating element and optionally further components to be provided are selected such that a corresponding lighting system remains flexible, i.e. deformable. In order to make a lighting system flexible, in particular layer thicknesses of respective layers, such as, for example, the light guide or the radiating element, can be limited to a permissible maximum.

Furthermore, the lighting system according to the invention can be configured to be flexible by selecting in the light guide for example a silicone content high enough for the light guide to still be able to deform at a predetermined layer thickness. In particular, it is provided that the light guide, except for a light source optionally integrated in the light guide, is made entirely of silicone and is correspondingly flexible.

According to a further possible configuration of the introduced production method, provision is made for the at least one radiating element to be bonded with a decorative layer which has at least one perforation opening. It is hereby further provided that the at least one light guide is connected via an adhesive layer, applied in a printing process upon the at least one light guide and/or on at least one reflector, with the at least one reflector.

In particular, it is provided that respective layers for the production of the lighting system according to the invention are applied upon one another in a printing process, by, applying, e.g., adhesive layers to respective layers with a printer, such as a screen printer for example.

According to a further possible configuration of the introduced production method, provision is made for the at least one reflector to be treated, in particular printed, such as to establish an even radiation of light beams back into the at least one light guide via the at least one reflector.

In order to connect the lighting system according to the invention to a carrier, such as, e.g., an interior structure of a vehicle door or a seat, and to integrate the lighting system correspondingly into the vehicle door or the seat, provision may be made for the arrangement of an intermediate layer on the reflector, which is made in particular at least in part of silicone. For this purpose, the intermediate layer, which, for example, is made of a nonwoven, is bonded with the reflector by an adhesive film for example, which is made of polyurethane. The intermediate layer is hereby constructed such as to be connectable to a respective carrier, i.e. bonded in particular. It is provided in particular that the lighting system according to the invention is comprised of a layer structure, which is made of a light guide layer, which is bonded with a radiating element of, e.g. nonwoven, on a side facing an environment, and with a reflector on a side facing away from the environment. The reflector in turn may be bonded on the side facing away from the environment with a nonwoven, such as, e.g., a spun-bonded fabric, so that the lighting system can be designed as a flat knitted fabric within two layers of nonwoven. Accordingly, the lighting system is suitable for introduction into interior modules, wherein the lighting system can be suited as a result of its flexibility provided in accordance with the invention to a shape of a respective decorative layer and/or respective carrier.

A uniform radiation of a reflector of a respective lighting element, i.e. prevention of differences in brightness when radiating light beams by the reflector can be achieved, for example, by coloring the reflector with black color for example.

The introduced lighting system allows production of lighting systems or interior components with particular pleasant haptic properties of, for example, a Shore hardness of A 80 and less.

According to a further possible configuration of the introduced production method, provision is made for the at least one reflector to be made of silicone and to be configured locally at least partially opaque according to predefined lighting requirements. It is hereby provided that the at least one reflector is connected to an intermediate layer, which enables a robust adhesive connection of the lighting system with a carrier material.

In order to make a respective reflector of a lighting element locally at least partially opaque in accordance with predefined lighting requirements, it may be provided that the reflector is manipulated, i.e. for example, pressed, stretched, compressed or printed. It can hereby be provided in particular that the reflector is at least partially printed black, so that local disparities in light intensity radiated by the reflector can be avoided or at least reduced.

According to a further possible configuration of the introduced production method, provision is made for the light guide to be connected in a first step via an adhesive to the radiating element and/or to the reflector, with the adhesive being activated in a second step.

In order to enable alignment or readjustment of a position of the light guide upon a radiating element or reflector after application of the radiating element and/or a reflector on the light guide, an adhesive can be used, which is applied in a first step and activated in a second step, so that a fixation of the position of the radiating element or reflector on the light guide is established only by the second step, i.e. the activation.

Further advantages and configurations of the invention will become apparent from the description and the accompanying drawings.

It is understood that the features mentioned above and those yet to be explained can be used not only in the respectively specified combination, but also in other combinations or taken alone, without departing from the scope of the present invention.

BRIEF DESCRIPTION OF THE DRAWING

An embodiment of the invention is schematically illustrated in the drawings and will be described schematically and in detail with reference to the drawings.

DETAILED DESCRIPTION OF PREFERRED EMBODIMENTS

Figure 1:
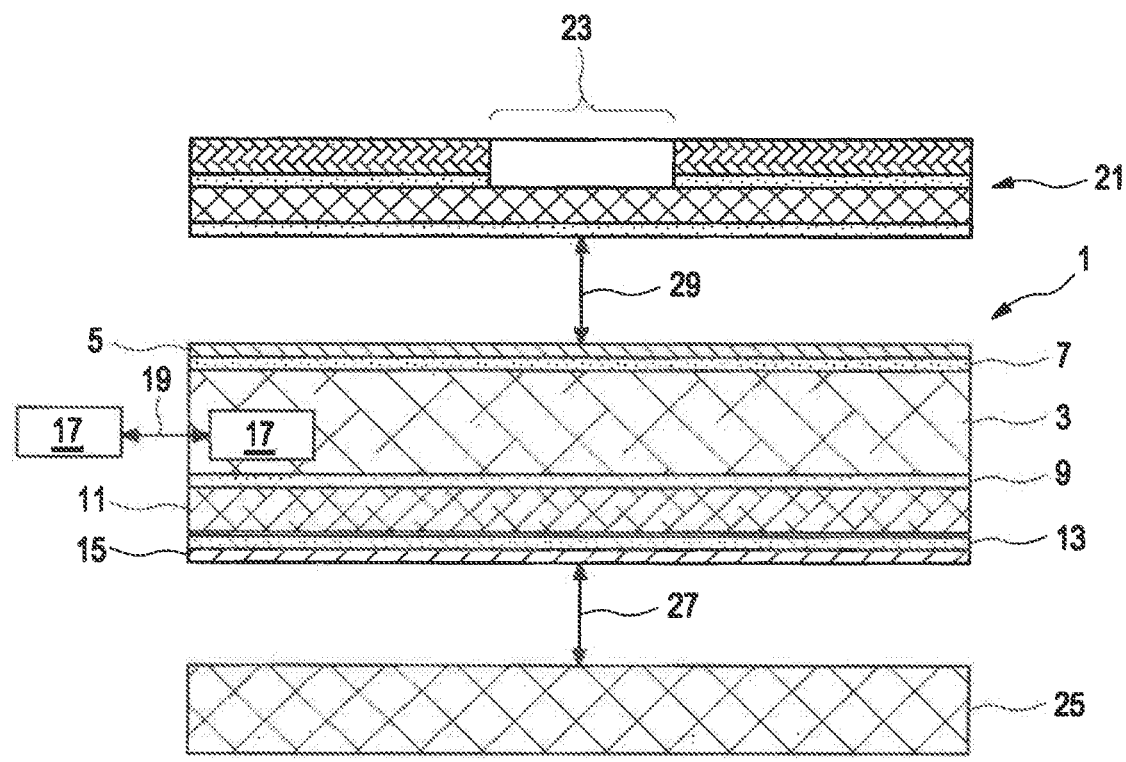
FIG. 1 shows a possible configuration of the lighting system according to the invention.

FIG. 1 shows a lighting system 1. The lighting system 1 includes a light guide 3, which is connected to a radiation element 5 via an adhesive layer 7 made of dispersion film. Furthermore, the light guide 3 is connected via an adhesive layer 9 of silicone adhesive with a reflector 11. The reflector 11 in turn is connected via an adhesive layer 13 of dispersion film with an intermediate layer 15. The Intermediate layer 15 is intended to connect the lighting system 1 to a carrier 25, such as, e.g., a lining part of a vehicle, in a joining process.

For connecting the lighting system 1 to the carrier 25, the lighting system 1, which is flexible due to a high silicone content in the light guide 3 and the reflector 11, is adapted to a shape of the carrier 25, i.e. for example pressed against the carrier 25, and then connected in a joining process with the carrier 25, as indicated by arrow 27. For this purpose, the intermediate layer 15 can, for example, be bonded or sewn to the carrier 25.

For illuminating the light guide 3 and, therefore, the lighting system 1, provision is made for a light source 17, which, as indicated by arrow 19, can be arranged within the light guide 3 or outside the light guide 3.

In order to shield the light source 17 aesthetically pleasing with respect to the surroundings, such as, e.g., a vehicle interior, a decorative layer 21 may be provided which has at least one perforation opening 23 to emit light radiating from the lighting system 1 in an environment of the lighting system 1. The decorative layer 21 is optically connected in a joining process with the light source 17 via the radiating element 5 and the adhesive layer 7, as indicated by arrow 29.

Figure 2A:
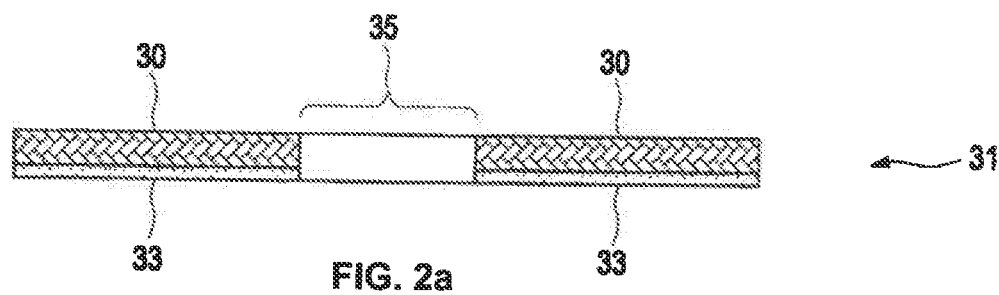
FIG. 2a, 2b, 2c show various steps of a method for the production of a decorative layer which is suitable for connection to a possible configuration of the lighting system according to the invention.
Figure 2B:
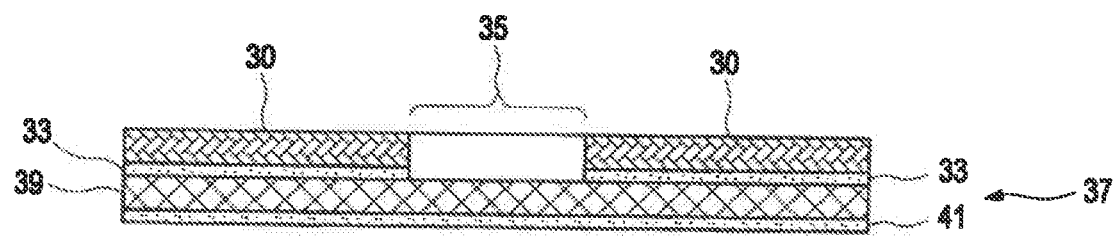
Figure 2C:
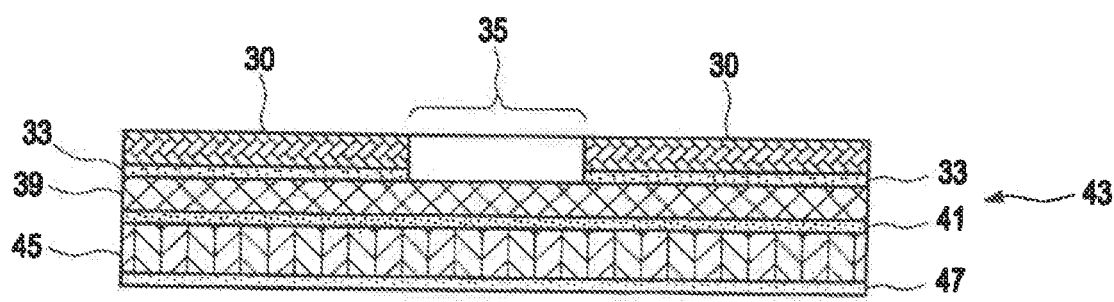

FIG. 2a, 2b, 2c shows show various steps of a method for the production of a decorative layer. Starting from a decorative material 30, which has, for example, a specific pattern, an adhesive film 33 of, e.g., polyethersulfone, is applied in a first step 31 (FIG. 2a) on the decorative fabric 30. The adhesive film 33 may hereby be surrounded with a protective film during a production process for better handling. As soon as the adhesive film 33 is connected to the decorative fabric 30, at least one perforation opening 35 can be introduced into the decorative layer of decorative material 30 and adhesive film 33 to make the decorative layer translucent. To prevent ingress of particles through the at least one perforation opening 35, a protective layer of, e.g. polyurethane, is arranged in a second step 37 (FIG. 2b) onto the adhesive film 33. The protective layer 39 in turn is likewise connected with an adhesive layer 41 of, e.g., polyethersulfone.

In a third step 43 (FIG. 2c), a spacer knitwear 45 can be provided in order to maintain a predefined distance between the decorative fabric 30 and a light guide for example, i.e. to enable an equidistant image of a design surface on a respective lighting system. For this purpose, the spacer knitwear 45 is connected to the adhesive layer 41. The spacer knitwear 45 in turn is provided with an adhesive film 47 of polyethersulfone for example, by means of which the decorative layer is to be connected with a lighting module, such as the lighting system 1 according to FIG. 1, by connecting the decorative layer to a radiating element of the lighting module.

Figure 3:
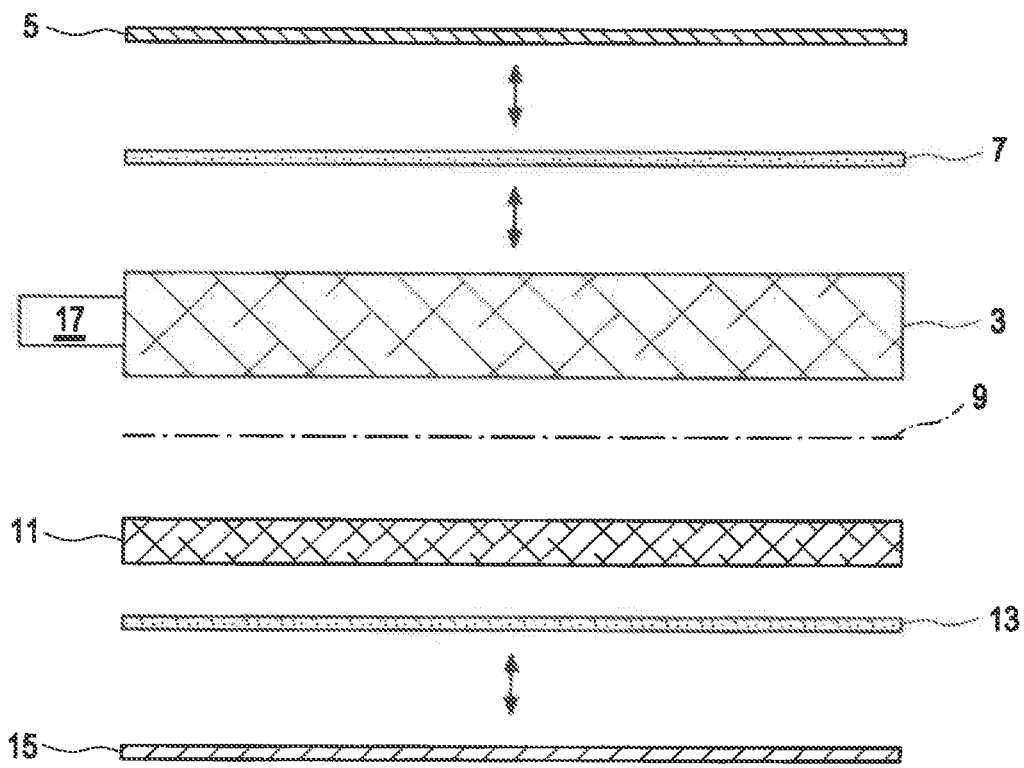
FIG. 3 shows a schematic illustration of a possible configuration of the production method according to the invention.

FIG. 3 shows a production method for the production of the lighting system 1 according to FIG. 1.

For the production of the light guide 3, a silicone molding is cast, into which light sources 17 are optionally incorporated. As an alternative, the light guide 3 can be supplied with light from the light source 17 via further light guides when the light source is arranged outside the light guide 3.

The light guide 3 is connected via the adhesive layer 7 in an adhesive process, in which an activatable adhesive for example is used, with the radiating element 5, which is made of nonwoven for example and acts accordingly as diffusor.

Furthermore, the light guide 3 is connected to the reflector 11. For this purpose, an adhesive layer 9 made of silicone adhesive is applied in a printing process, such as, e.g., a screen printing process, onto the light guide 3 and/or the reflector 11. Furthermore, the reflector 11 is colored black to avoid generation of light spots when illuminating the reflector with light from the light source 17.

Finally, the intermediate layer 15 is connected via the adhesive film 13 with the reflector 11. The intermediate layer 15 may, for example, be a nonwoven, in particular a spun-bonded fabric, and is intended to enable a stable connection of the lighting system 1 to a carrier made of a plastic for example.

The invention claimed is:

1. A lighting system for an interior module of a vehicle, said lighting system comprising:
    a light source;
    a light guide made, at least in part, of silicone;
    a radiation element optically connected to the light guide on at least one side and made, at least in part, of nonwoven material, said radiation element being supplied via the light guide during operation of the lighting system with light, generated by the light source;
    a decorative layer connected to the radiation element and including at least one perforation opening for emitting light beams radiating by the radiating element; and
    a perforation-opening engagement formfittingly forming with the decorative layer a smooth surface which is substantially impermeable to contamination to thereby prevent ingress of dirt particles into the radiating element or the light guide,
    wherein the lighting system is configured flexible enough so that the lighting system, when connected to a carrier layer, conforms to a shape of the carrier layer.

2. The lighting system of claim 1, wherein the perforation-opening engagement includes a protective layer configured to engage formfittingly the perforation opening of the decorative layer on a side facing the radiating element to form with the decorative layer the smooth surface.

3. The lighting system of claim 1, wherein the radiating element is configured to define the perforation-opening engagement by engaging formfittingly the perforation opening of the decorative layer to form with the decorative layer the smooth surface.

4. The lighting system of claim 1, wherein the light source is embedded as an integrative component in the light guide.

5. The lighting system of claim 1, wherein the radiating element is connected to the light guide via a transparent adhesive layer.

6. The lighting system of claim 5, wherein the transparent adhesive layer is made at least of a reactive film system or thermoplastic adhesive film.

7. The lighting system of claim 1, further comprising a reflector reflecting light beams, generated by the light source, in a direction of the radiating element, said light guide being connected on a side facing away from the radiating element to the reflector.

8. The lighting system of claim 7, wherein the reflector is connected on a side facing away from the radiating element with an intermediate layer, which enables an adhesive connection of the lighting system with the carrier layer.

9. The lighting system of claim 8, wherein the intermediate layer is made, at least in part, of a nonwoven material.

10. The lighting system of claim 8, wherein the reflector is treated, at least in part, to realize even radiation of light beams back into the light guide via the reflector.

11. The lighting system of claim 10, wherein the reflector is at least printed.

12. A method for producing a lighting system for an interior module of a vehicle, said method comprising:
    optically connecting a light guide made, at least in part, of silicone with a radiating element;
    supplying light to the radiating element from a light source via the light guide;
    bonding the radiating element to a decorative layer;
    connecting the light guide with a reflector via an adhesive layer applied in a printing process upon the light guide and/or upon the reflector;
    formfittingly engaging a perforation opening of the decorative layer to form with the decorative layer a smooth surface which is substantially impermeable to contamination to thereby prevent ingress of dirt particles into the radiating element or the light guide; and
    selecting a content of silicone of the light guide such as to render a produced lighting system flexible enough to conform upon connection with a carrier layer to a shape of the carrier layer.

13. The method of claim 12, wherein the perforation opening of the decorative layer is formfittingly engaged by a protective layer on a side facing the radiating element to form with the decorative layer the smooth surface.

14. The method of claim 12, wherein the perforation opening of the decorative layer is formfittingly engaged by the radiating element to form with the decorative layer the smooth surface.

15. The method of claim 12, further comprising:
    making the reflector of silicone;
    locally configuring the reflector, at least in part, opaque by a printing process according to a predefined lighting requirement; and
    connecting the reflector with an intermediate layer, which enables an adhesive connection of the lighting system with the carrier layer.

* * * * *